(12) United States Patent
Matsumura et al.

(10) Patent No.: US 11,736,900 B2
(45) Date of Patent: Aug. 22, 2023

(54) GUARDIAN SERVICE PROVISION SYSTEM, PROGRAM, AND GUARDIAN SERVICE PROVISION METHOD

(71) Applicant: BizMobile Inc., Tokyo (JP)

(72) Inventors: Jun Matsumura, Tokyo (JP); Yoshihiro Obata, Tokyo (JP)

(73) Assignee: IoT-EX Inc., Tokyo (JP)

( * ) Notice: Subject to any disclaimer, the term of this patent is extended or adjusted under 35 U.S.C. 154(b) by 218 days.

(21) Appl. No.: 17/252,733

(22) PCT Filed: Jun. 14, 2019

(86) PCT No.: PCT/JP2019/023680
§ 371 (c)(1),
(2) Date: Dec. 16, 2020

(87) PCT Pub. No.: WO2019/244794
PCT Pub. Date: Dec. 26, 2019

(65) Prior Publication Data
US 2021/0195380 A1    Jun. 24, 2021

(30) Foreign Application Priority Data
Jun. 18, 2018    (JP) .................................. 2018-115261

(51) Int. Cl.
*H04W 4/029* (2018.01)
*H04W 4/021* (2018.01)
(Continued)

(52) U.S. Cl.
CPC ........... *H04W 4/029* (2018.02); *H04W 4/021* (2013.01); *H04W 12/02* (2013.01); *H04M 1/0202* (2013.01)

(58) Field of Classification Search
CPC ....... H04W 4/021; H04W 4/02; H04W 4/029; H04W 4/90; H04W 76/50; G01S 19/17;
(Continued)

(56) References Cited

U.S. PATENT DOCUMENTS

| 6,618,593 B1* | 9/2003 | Drutman ............ G08B 21/0294 455/414.1 |
| 7,853,268 B2* | 12/2010 | Karaoguz ............... H04W 4/02 340/572.1 |

(Continued)

FOREIGN PATENT DOCUMENTS

| CN | 107077774 A | 8/2017 |
| JP | 2003-174396 A | 6/2003 |

(Continued)

OTHER PUBLICATIONS

International Search Report for PCT/JP2019/023680 dated Aug. 6, 2019.

(Continued)

*Primary Examiner* — Matthew C Sams
(74) *Attorney, Agent, or Firm* — Yokoi & Co., U.S.A.; Toshiyuki Yokoi

(57) ABSTRACT

To protect privacy when monitoring a child going to school or preparatory school, by restricting information saved on the application side. A system for providing a guardian service for monitoring a management target Ch under supervision by means of his/her smartphone 3, said system comprising: an application execution unit 312 for executing an application on an OS of the smartphone 3; a position information acquisition unit 39 for measuring the current position of the smartphone 3 as a function of the OS; a monitoring area setting unit 245a for setting a monitoring area A1 for the position information acquisition unit 39; an OS side notification unit 331c for, when the current position of the smartphone 3 is out of the monitoring area A1, issuing (Continued)

a notification to that effect to an application side notification acquisition unit 312a as the function of the OS; and the notification acquisition unit 312a serving as a function of the application for acquiring notifications from the OS side notification unit 331c.

10 Claims, 5 Drawing Sheets

(51) Int. Cl.
*H04W 12/02* (2009.01)
*H04M 1/02* (2006.01)

(58) Field of Classification Search
CPC ............... G08B 13/00; G08B 21/0261; G08B 21/0269; G08B 21/028; G08B 21/0283; G08B 25/016; G08B 25/10; G08B 25/14; G08B 3/10; G08G 1/207; H04M 1/72424
See application file for complete search history.

(56) References Cited

U.S. PATENT DOCUMENTS

| | | | | |
|---|---|---|---|---|
| 8,538,374 B1* | 9/2013 | Haimo | ............... | H04W 4/90 455/410 |
| 8,761,799 B2* | 6/2014 | Meredith | ............... | H04L 63/107 455/456.2 |
| 8,768,309 B2* | 7/2014 | Robbins | ............... | H04L 67/54 455/412.2 |
| 8,930,458 B2* | 1/2015 | Lewis | ............... | G08B 27/001 709/219 |
| 9,706,380 B1* | 7/2017 | Murchison | ............ | H04W 4/021 |
| 9,788,160 B1* | 10/2017 | Gu | ............... | H04W 4/021 |
| 10,397,751 B2* | 8/2019 | Shapiro | ............... | H04M 7/006 |
| 11,037,430 B1* | 6/2021 | Luzynski | ............... | H04W 4/12 |
| 11,057,741 B2* | 7/2021 | Hunter | ............... | H04W 4/021 |
| 11,074,642 B2* | 7/2021 | Mehrhoff | ............ | G06Q 30/0639 |
| 11,606,686 B2* | 3/2023 | Alameh | ............... | H04W 12/64 |
| 2003/0119529 A1 | 6/2003 | Hirokawa | | |
| 2005/0136942 A1* | 6/2005 | Timiri | ............... | H04W 64/00 455/456.1 |
| 2008/0081638 A1* | 4/2008 | Boland | ............... | H04W 4/029 455/456.1 |
| 2010/0267361 A1* | 10/2010 | Sullivan | ............... | G01S 19/17 455/404.2 |
| 2013/0040600 A1* | 2/2013 | Reitnour | ............ | H04M 1/72424 455/418 |
| 2016/0379454 A1* | 12/2016 | Divakara | ............ | H04M 1/72424 340/539.13 |
| 2017/0132900 A1 | 5/2017 | Lee et al. | | |

FOREIGN PATENT DOCUMENTS

| | | |
|---|---|---|
| JP | 2006-54623 A | 2/2006 |
| JP | 2010-259076 A | 11/2010 |
| JP | 2018-23089 A | 2/2018 |
| JP | 2018-85079 A | 5/2018 |
| WO | 2019/077341 A | 4/2019 |

OTHER PUBLICATIONS

PCT written opinion dated Aug. 6, 2019.
Extended European Search Report dated Jul. 1, 2021.
Korean Office Action dated May 6, 2021.
Chinese Office Action dated Jun. 2, 2021.
Stephen Statler et al., Beacon Technologies, The Hitchhiker's Guide to the Beacosystem, Jun. 17, 2016, Chapters 1 & 17.
Oliver Drobnik, Barcodes with iOS, Bringing together the digital and physical worlds, Feb. 19, 2015, Chapter 7.3.
English translation of PCT written opinion dated Aug. 6, 2019.

* cited by examiner

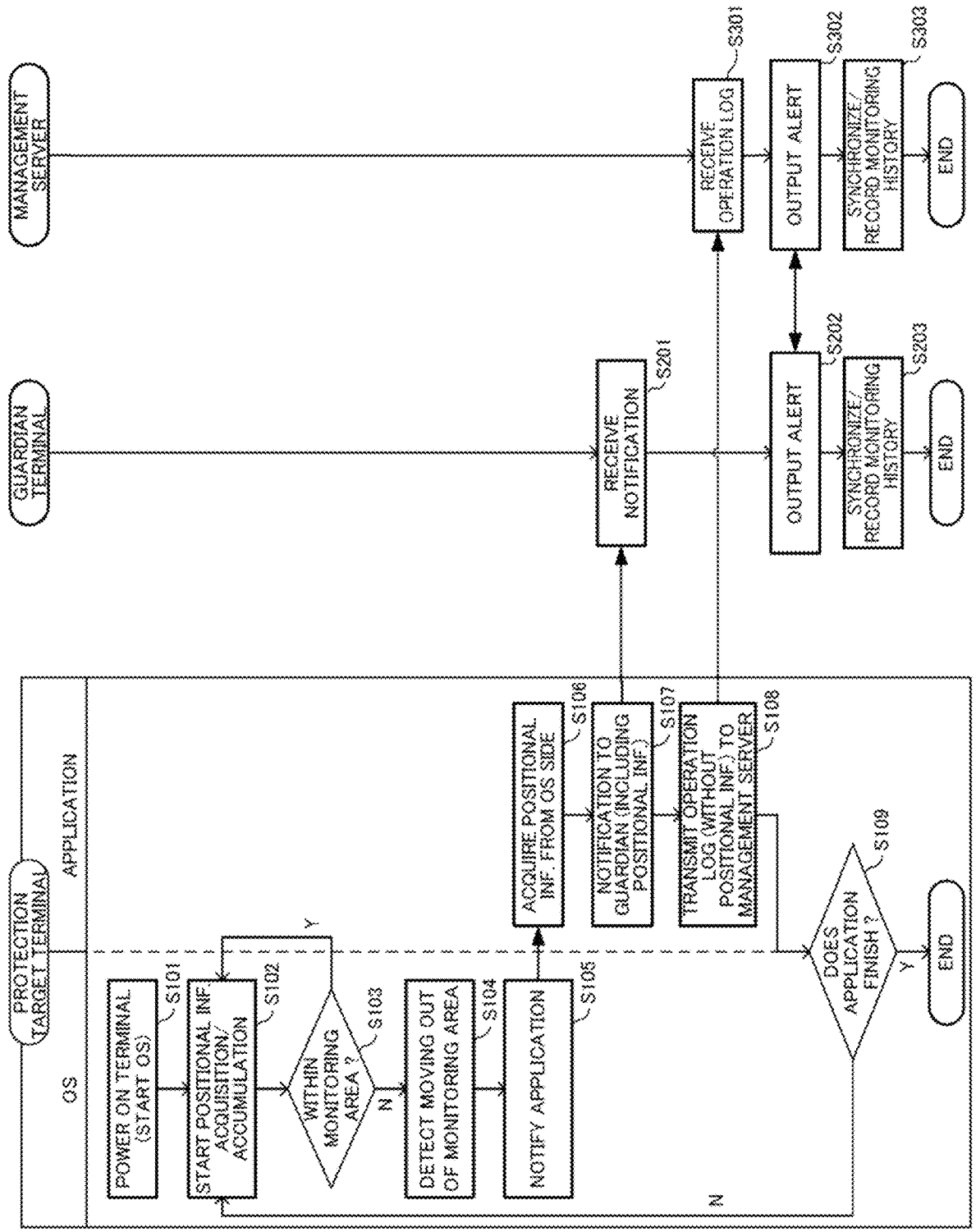

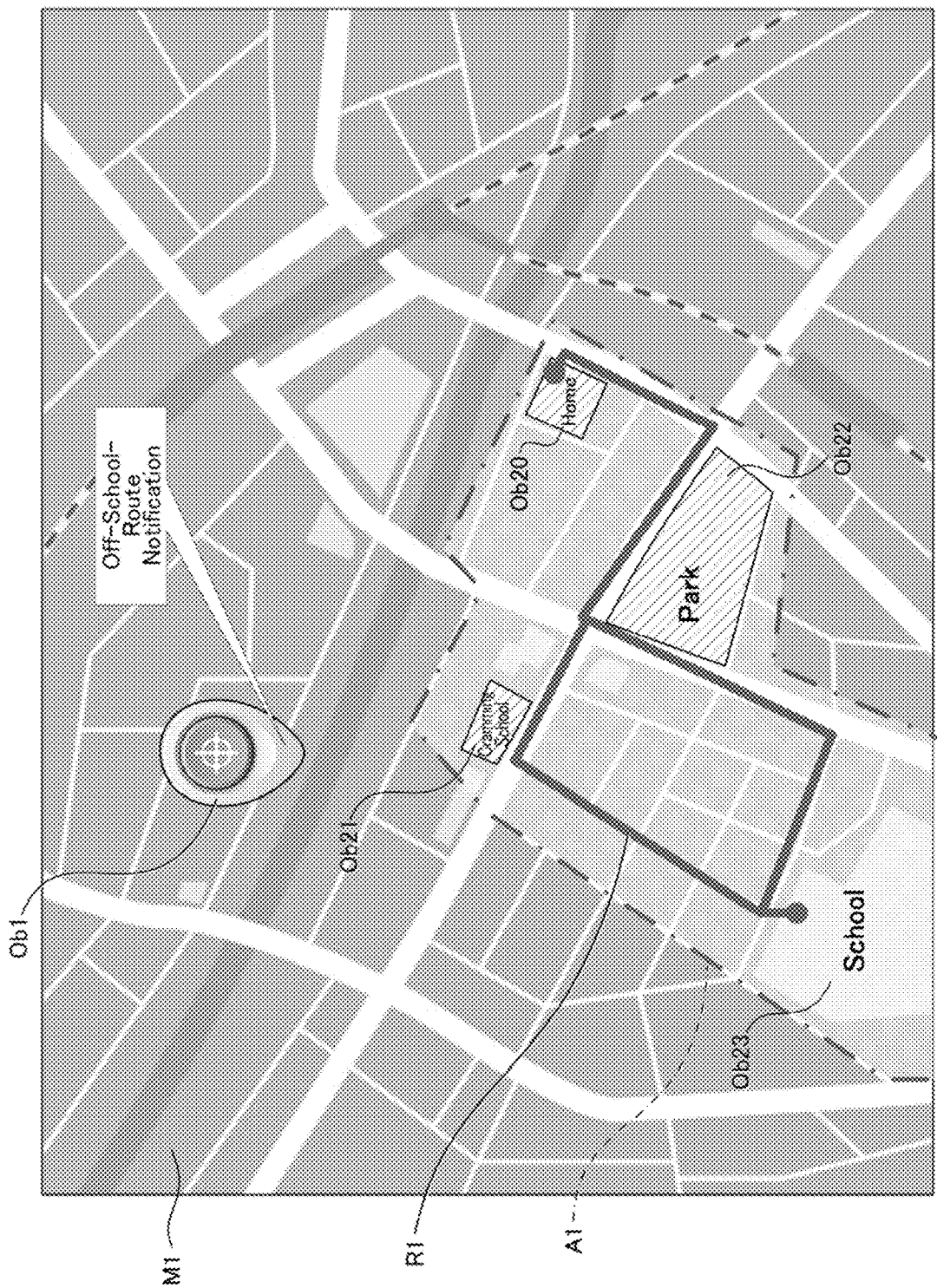

GUARDIAN SERVICE PROVISION SYSTEM, PROGRAM, AND GUARDIAN SERVICE PROVISION METHOD

TECHNICAL FIELD

The present invention relates to a guardian service provision system, a program and a guardian service provision method for monitoring a guarding target through an information terminal which is possessed by the guarding target.

BACKGROUND ART

In recent years, there are many painful incidents, some of which are unsolved yet, such that a suspicious person does an injury or mischief to a child in going and leaving to/from school, that a suspicious person takes away a child by a vehicle, kills the child in another place and abandon the killed child. Also, the chances for children to encounter unexpected accidents including a traffic accident so that the risk to encounter accidents for children is increased on its way to/from a school.

From these facts, recently, a variety of crime prevention systems have been developed such that a child carries a crime prevention device on its way to/from a school to activate the crime prevention device to notify surrounding persons or make an emergency call to the police, a security company, a school or the like by means of the communication capability installed in the crime prevention device, for example when a suspicious person approaches, attacks or takes away the child involved in the crime or when encountering an accident, and that a GPS (Global Positioning System) is installed in the crime prevention device to always track the current position of the child who carries the crime prevention device, and so forth.

Furthermore, in recent years, while the portable information terminal such as the smartphone has been advanced, such a system and service have been developed to monitor the current position of a smartphone by an application running on the smartphone, record the moving path of the smartphone. For example, the smartphone of a guardian is notified that a school child moves out of a predetermined area by monitoring the moving path of the school child to be protected going to a school or a preparatory school.

PRIOR ART DOCUMENTS

Patent Documents

[Patent Document 1] Japanese Unexamined Patent Application Publication No. 2006-54623

SUMMARY OF THE INVENTION

Problems to be Solved by the Invention

However, in the case where the current position of the guarding target is measured and recorded by an application of a smartphone, it is inevitable to open privacy information including the real position and usage information of the guarding target to the developer/operator of the application. Because of this, there is concern of leaking the privacy information from the developer/operator of the application by any chance. On the other hand, from the view point of the developer/operator of the application, a high level security must be ensured in order not to leak the privacy information during the operation of the application so that necessary costs increase, and there is the possibility that the burden on the developer/operator side is further increased when information is leaked by any chance so that liability for damages may occur.

The present invention is invented taking into consideration the problems as described above and in order to solve these problems, it is therefore an object to provide a guardian service provision system, a program and a guardian service provision method for protecting privacy by limiting information which is saved in the application side when monitoring a school child going to a school or a preparatory school.

Means for Solving Problem

In order to accomplish the object as described above, the present invention is characterized by a guardian service provision system which provides a guardian service for monitoring a guarding target through an information terminal possessed by the guarding target, comprising: an application execution unit configured to execute an application on an OS of the information terminal; a positional information acquisition unit configured to measure a current position of the information terminal as a function of the OS; a monitoring area setting unit configured to set a monitoring area to the positional information acquisition unit; an OS side notification unit configured to notify the application, as a function of the OS, when the current position of the information terminal moves out of the monitoring area; and a notification acquisition unit configured to acquire, as a function of the application, a notification from the OS side notification unit.

Also, the present invention is related to a guardian service provision method which provides a guardian service for monitoring a guarding target through an information terminal possessed by the guarding target, comprising:

(1) an execution/setting step of executing an application on an OS of the information terminal by an application execution unit, and setting a monitoring area by a monitoring area setting unit to a positional information acquisition unit which measure a current position of the information terminal as a function of the OS; and (2) a notifying step of notifying the application, by an OS side notification unit as a function of the OS, when the current position of the information terminal moves out of the monitoring area, and acquiring, as a function of the application, a notification from the OS side notification unit.

In the case of the above invention, it is preferred that the monitoring area setting unit is implemented within the management terminal.

In the case of the above invention, it is preferred to further provide a management notifying step of notifying the current position acquired from the positional information acquisition unit to the management terminal by a management notification unit in response to the notification acquired by the notification acquisition unit.

In the case of the above invention, it is preferred that the monitoring area is an area including a moving route of the guarding target and a predetermined region adjacent to the moving route.

In the case of the above invention, it is preferred to further provide a remote operation step of performing operation of the application by a remote operation unit of the management terminal through an application execution unit of the information terminal.

Incidentally, the system and method as described above in accordance with the present invention can be implemented in a computer by running a program of the present invention described in a predetermined language. Namely, the method of the present invention can be implemented by installing the program of the present invention in an IC chip or a memory device of a mobile terminal device, a smartphone, a wearable terminal, a mobile PC, another type information processing terminal, or a general purpose computer such as a personal computer or a server computer, and running the program on the CPU to build the system of the present invention having the functionality as described above.

Also, the program of the present invention can be distributed, for example, through a communication line, or as a package application which can be run on a stand-alone computer by storing the program in a computer readable storage medium. Such a storage medium includes a magnetic recording medium such as a flexible disk or a cassette tape, an optical disc such as CD-ROM or DVD-ROM, a RANI card and a variety of storage mediums. In addition, in accordance with the computer readable medium in which this program is stored, the above system and method can be easily implemented with a general purpose computer or a dedicated computer, and the program can be easily maintained, transported and installed.

Effects of the Invention

As has been discussed above, in accordance with the present invention, it is possible to have the guarding target such as a school child or the like carry an information terminal such as a smartphone, set the school route and school hours in advance with a smartphone of a guardian as the management terminal, readily acquire the positional information by the application, and notify the management terminal when the school child substantially departs from the school route. At this time, the positional information is acquired by a function in the OS side, and the application acquires, from the OS, only the determination result of whether or not the current position of the guarding target is within the monitoring area.

Specifically, in accordance with the present invention, the personal information including the positional information of the monitoring target is monitored only by the OS, and transferred to the application only when the monitoring target moves out of the monitoring area, and while the positional information transferred to the application is immediately transmitted to the terminal of the guardian, only the operation log including no positional information is transmitted to the management server. The positional information transferred to the application of the monitoring target terminal and the application of the terminal of the guardian is stored or deleted in accordance with the condition which is set by the user.

As a result, in the case of the present embodiment, the personal information including the positional information shall not be transferred to the management server, and will be stored or deleted on the user own responsibility. Because of this, in the developer/operator side of the application, according to the present embodiment, there is no need to ensure a high level security for not leaking privacy information such as positional information when running the application. Accordingly, it is possible to reduce a burden required for development/operation and guarantee relating to information leakage and ensure the system in which GDPR (General Data Protection Rules) can be observed.

BRIEF DESCRIPTION OF THE DRAWINGS

FIG. 7 is a sequence diagram for showing the operation of the guardian service provision system in accordance with the invention.

FIG. 8 is an explanatory view for showing a monitoring area of the guardian service provision system in accordance with the invention.

MODE FOR CARRYING OUT THE INVENTION

In what follows, an embodiment of the present invention will be explained with reference to drawings. Throughout the drawings, same or similar parts and elements are given same or similar references. Incidentally, the embodiment described below has been disclosed with devices and the like by way of illustration for implementing the technical idea of the present invention, which is not limited to the material, formation, structure, arrangement of each constituent member as described below. The technical idea of the present invention can be modified within the scope of claims.

(Overall Configuration of Guardian Service Provision System)

Figure 1:
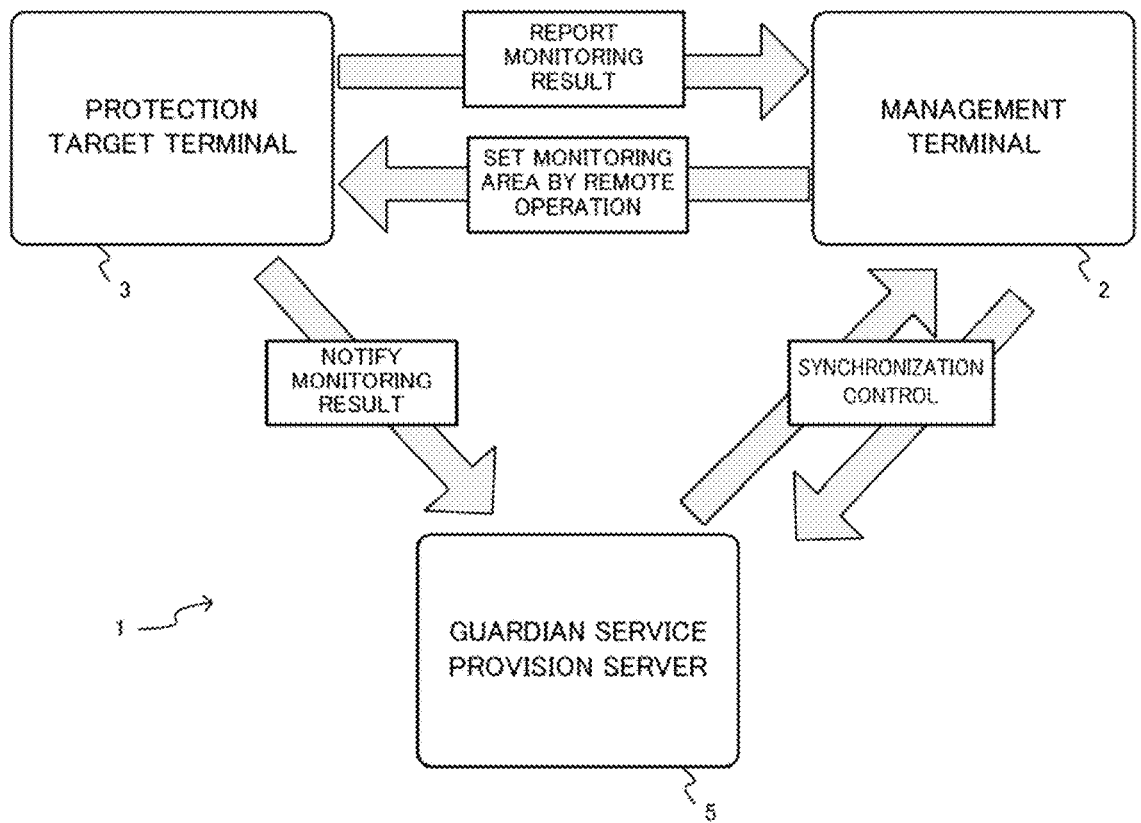
FIG. 1 is a schematic representation for showing the general outline of a guardian service provision service in accordance with an embodiment.
Figure 2:
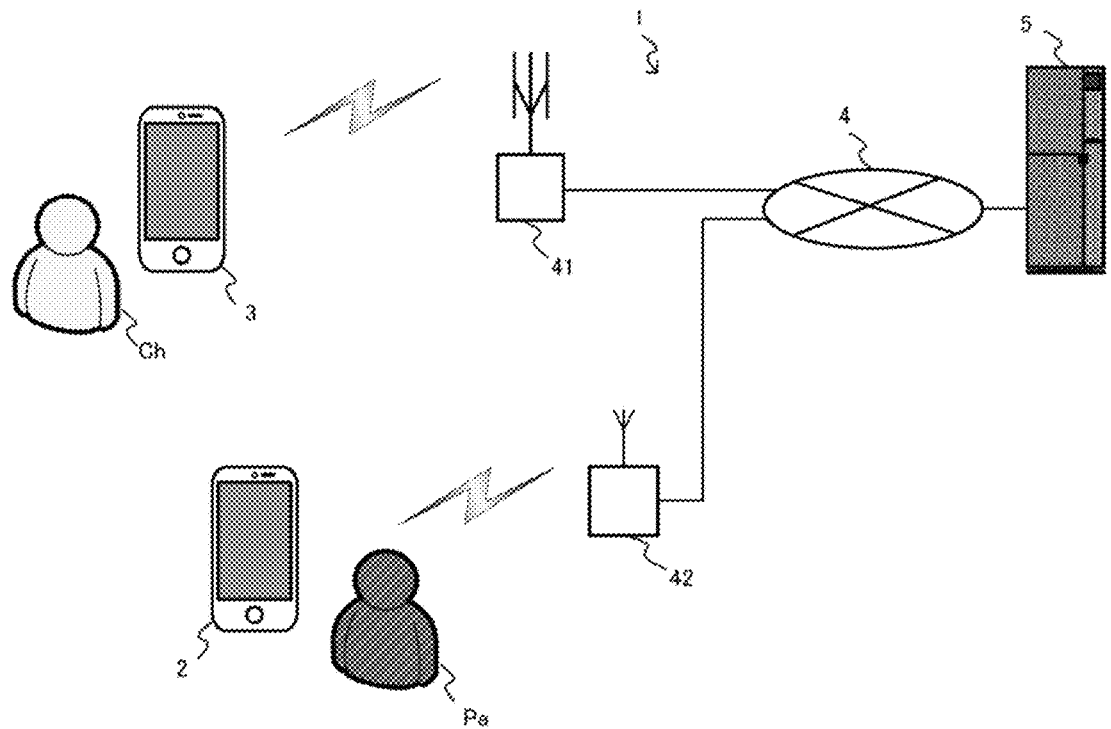
FIG. 2 is a block diagram for showing the overall configuration of a guardian service provision system in accordance with the embodiment.

First, the general outline of a guardian service and the overall configuration of the guardian service provision system will be explained. FIG. 1 is a schematic representation for showing the overall configuration of the guardian service in accordance with the present embodiment, and FIG. 2 is a block diagram for showing the overall configuration of the guardian service provision system.

As shown in FIG. 1, the guardian service in accordance with the present embodiment is based on a system for providing a guardian service for monitoring a guarding target through an information terminal carried by a school child or the like as the guarding target. More specifically speaking, the current position of a smartphone 3 as a guarding target terminal used by a school child as a guarding target is monitored in accordance with a predetermined time zone by setting in advance a school route and a school hour to the guardian service provision server 5 with a smartphone 2 as a management terminal used by a guardian. When monitoring the guarding target terminal, it is performed to monitor the current position and send notification by the guarding target terminal itself, and to monitor the guarding target terminal and notify the management terminal by a guardian service provision server 5 which is operated by a guardian service provision company. A monitoring application is downloaded to the guarding target terminal, and this monitoring application readily acquires the positional information of the smartphone 2 used by the child through the OS of the guarding target terminal, and notifies the positional information to the guardian service provision server 5 and the smartphone 2 when the school child substantially departs from the school route.

Specifically, the guardian service provision system 1 in accordance with the present embodiment generally includes the guardian service provision server 5 operated by a management company which provides a monitoring service, the smartphone 3 used by a management target Ch such as a pupil going to school, a school child or the like, the smartphone 2 used by a guardian Pa of this pupil or child, and the Internet 4 through which the guardian service provision server 5 operated by the guardian service provision company supporting study management of the guardian Pa can communicate. Incidentally, in the explanation of the present embodiment, the smartphones 3 and 2 are examples of the guarding target terminal and the management terminal.

The guardian service provision company provides a guarding target program and a management terminal program through the Internet, and provides a service for monitoring the guarding target through the guardian service provision server 5.

The guardian Pa is a user who desires monitoring a child as the management target Ch commuting to school through the management terminal program. On the other hand, the guardian Pa pays a flat rate fee and an additional fee to the guardian service provision company as the use fees of the guarding target program and the management terminal program.

In the case of the present embodiment, the guardian service provision server 5 is a content server for monitoring the smartphone 3 which is the guarding target terminal through the Internet 4, notifying the monitoring result to the smartphone 2 which is the management terminal, acquiring setting information from the smartphone 2 to set a monitoring area, and other interfaces required for providing the guardian service. The guardian service provision server 5 can be implemented with a single server device or a group of a plurality of servers. The guardian service provision server 5 virtually builds a plurality of function modules on a CPU so that processes are performed by cooperation of the function modules. In addition, this guardian service provision server 5 can perform data transmission and reception through Internet 4 by communication functionality, and can perform displaying a Web page through a browser software by Web server functionality.

Each of the smartphones 3 and 2 is an information processing terminal device making use of wireless communication, and provided with an arithmetic processing unit such as a CPU to execute application software and provide a variety of functions. This information processing terminal may be implemented with a general purpose computer such as a personal computer or a dedicated device having necessary functions, and includes a smartphone, a tablet PC, a mobile computer, a cellular telephone, a wearable terminal device, a game device, or the like mobile terminal.

Also, each of the smartphones 3 and 2 wirelessly communicates with a relay point such as a wireless base station 41 or 42 to receive a communication service such as telephone conversation, data communication or the like while moving. The communication system for this telephone conversation or data communication may be, for example, the 3G (3rd. Generation) system, the 4G system, the FDMA system, the TDMA system, the CDMA system, the WCDMA system or the PHS (Personal Handyphone System). Also, this smartphone 3 or 2 is implemented with various functions such as a digital camera function, an application software execution function, a positional information acquisition function utilizing GPS (Global Positioning System) or the like, and a mobile computer such as a tablet PC may be used instead.

The positional information acquisition function installed in the smartphone 3 is a function to acquire and record positional information indicating the position of own device. This positional information acquisition function may detect the position of own device, for example, by the use of signals from a satellite such as GPS, the intensity of radio waves from wireless base stations 41 and 42 for cellular phones and an access point of Wifi communication or the like.

Then, this smartphone 3 or 2 is provided with a display unit such as a liquid crystal display for displaying information, and also provided with an operation device such as an operation button through which a user can perform input operation. This operation device also includes a touch panel which is arranged overlaid on the liquid crystal display as an input unit through which an operation signal is acquired in response to a touch operation pointing a coordinate position on the liquid crystal display and so forth. More specifically, this touch panel is an input device for inputting an operation signal through a pressure in response to a touch operation with a user's finger, a pen or the like, and includes a liquid crystal display for displaying graphics and a touch sensor overlaid on the liquid crystal display to accept an operation signal in correspondence with an coordinate position in the graphics displayed on this liquid crystal display.

The Internet 4 including wireless communication networks is a distributed communication network which is constructed by connecting a variety of communication lines (public lines such as telephone lines, ISDN lines, ADSL lines and optical lines, dedicated communication lines, and wireless communication networks such as LTE, 3G, 4G) to each other by the use of the communication protocol TCP/IP. This Internet 4 may include an intranet (a network within a company) based on 10Base-T, 100Base-TX or the like, a predetermined area (company, home or the like) network such as LAN/Wifi, or the like.

The radio base station 41 or 42 is connected to the Internet 4 through a relay device, establishes wireless communication connection with the smartphone 3 or 2 by a communication system such as 4G, LTE and 3G to provide telephone conversation or data communication through the smartphone 3 or 2. The radio base station 41 or 42 is provided with a node device such as a modem, a terminal adapter, gateway apparatus or the like, and serve to perform relay operation between the wireless base station 41 or 42 and the Internet 4 by selecting communication routes and performing inter-conversion of data (signals).

(Internal Configuration of Each Device)

Figure 3:
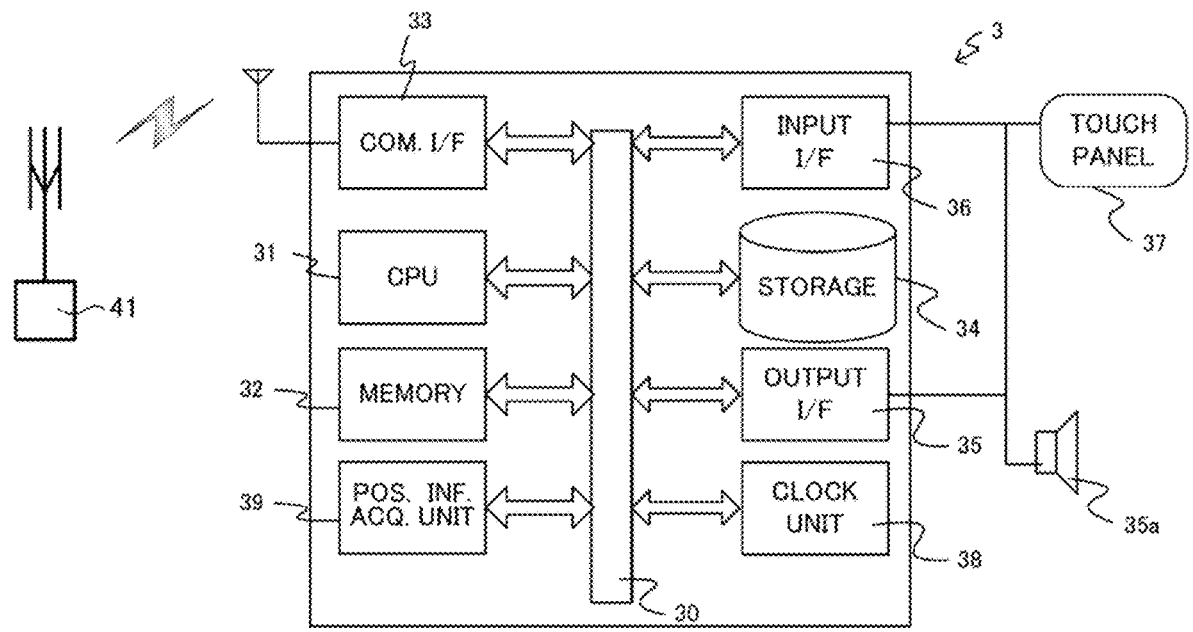
FIG. 3 is a block diagram for showing the hardware configuration of a smartphone which is the guarding target terminal in accordance with the embodiment.
Figure 4:
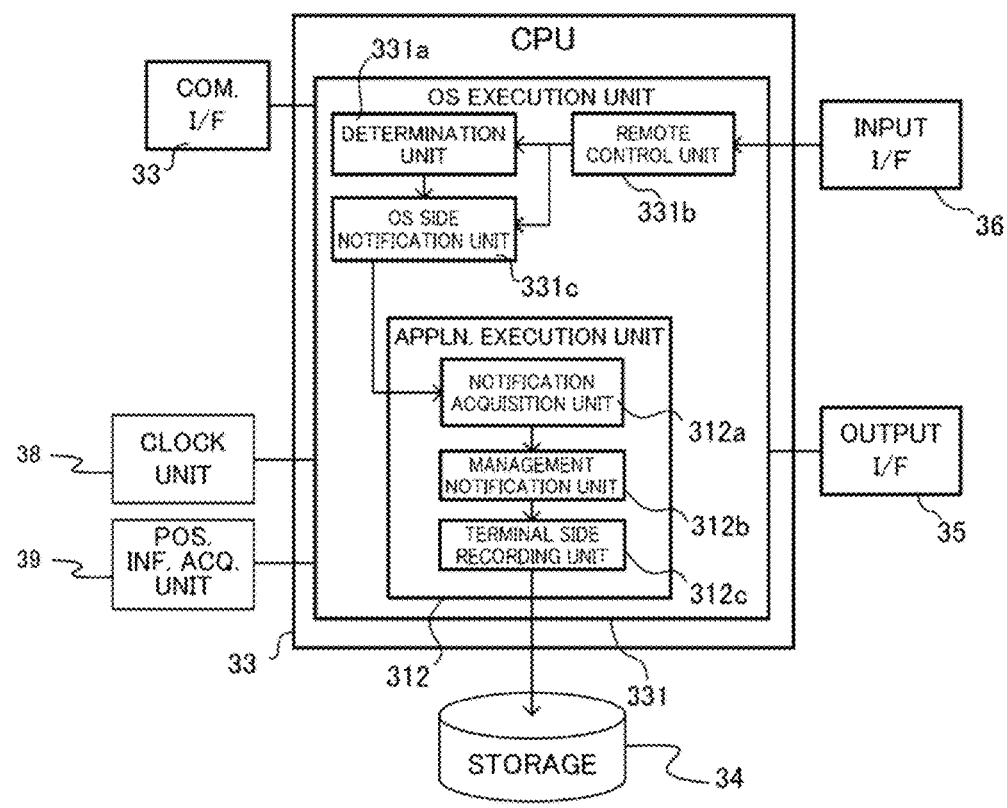
FIG. 4 is a block diagram for showing the function module of the guarding target terminal in accordance with the embodiment.
Figure 5:
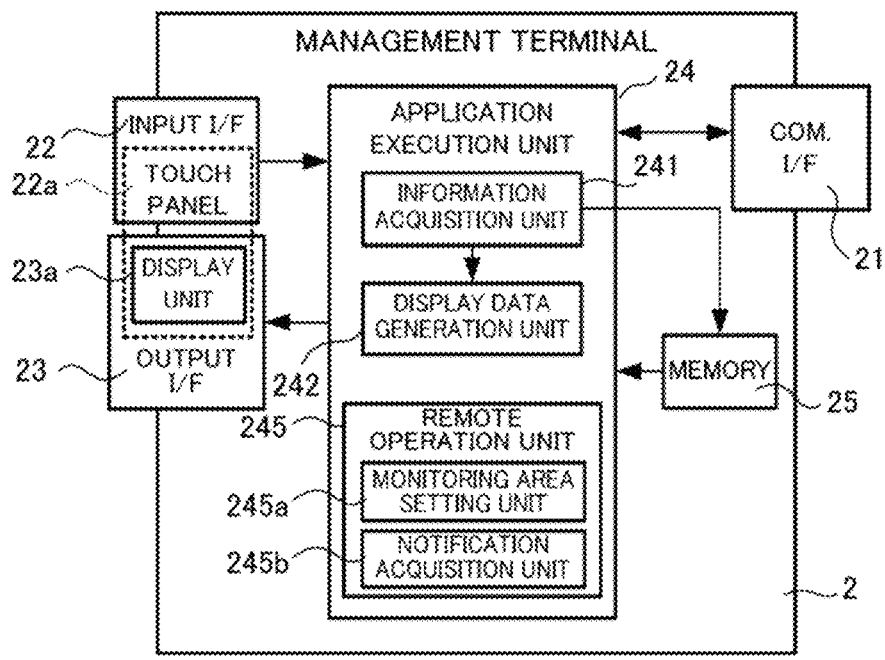
FIG. 5 is a block diagram for showing the function modules of a smartphone which is the management terminal in accordance with the embodiment.

Next is an explanation of the internal configuration of each device constituting the guardian service provision system as described above. FIG. 3 and FIG. 4 show the internal configuration of the smartphone 3 used by the management target Ch and the internal configuration of the smartphone 2 used by the guardian Pa of the management target Ch, and FIG. 5 shows the internal configuration of the guardian service provision server 5 in accordance with the present embodiment. Incidentally, the term "module" used in the following explanation stands for a function unit capable of performing a predetermined operation and implemented with hardware such as a device or apparatus, software capable of performing the functionality as the hardware performs, or a combination thereof.

(1) Management Target Terminal (Smartphone 3)

Next is an explanation of the internal configuration of the smartphone 3 which is the management target terminal used by the management target Ch. As illustrated in FIG. 3, the smartphone 3 includes a storage 34 serving as a storage unit, a CPU 31 which performs arithmetic operations, a memory 32 which temporarily stores information, a communication I/F 33 for communication with the outside through the Internet 4, an output I/F 35 and an input I/F 36. Meanwhile, in the case of the present embodiment, these storage 34, CPU 31, memory 32, communication I/F 33 and the like are connected to each other through a CPU bus 30 to exchange data thereamong.

The storage 34 accumulates data on a recording medium, and reads out accumulated data in response to an request from each device. The storage 34 may be implemented, for example, by a hard disk drive (HDD), a solid state drive (SSD), a memory card, and the like.

The CPU 31 is a device which performs a variety of arithmetic operations required for controlling each element to virtually build a variety of modules on the CPU 31 by running a variety of programs. In the case of the present embodiment, by executing a call connection rate measurement program on this CPU 9 in accordance with the present invention, it is possible to use this general purpose smartphone 3 as a call connection rate measurement device. Incidentally, the term "module" used in the following explanation stands for a function unit capable of performing a predetermined operation and implemented with hardware such as a device or apparatus, software capable of performing the functionality as required, or a combination thereof.

The communication I/F 33 is a module for communicating with the radio base stations 41 and 42 and the like through wireless communication by the use of known devices, communication systems and wireless communication networks serving as an LTE line, a 3G/4G line, Wifi (registered trademark), Bluetooth (registered trademark) and the like.

Also, the CPU bus 30 is connected to a positional information acquisition unit 39 for measuring the current position of own device by the use of a GPS or ID/coordinates of the radio base stations 41 and 42, and a clock unit 38 for clocking the present time. The measurement results of the positional information acquisition unit 39 and the clock unit 38 are transferred in response to a request of the OS or an application running on the CPU 31 as status information of own device. Incidentally, the positional information acquisition unit 39 of the present embodiment is a module for measuring the current position of own device as a function implemented in the OS, and independently executed separate from the function of the application executed by an application execution unit 312.

The positional information acquisition unit 39 is a module for acquiring the position (latitude, longitude and altitude) and orientation of the smartphone 3 as current positional information. More specifically, this positional information acquisition unit 39 acquires latitude, longitude, altitude, orientation of own device, relative moving distance and relative rotation angle as the current positional information of own device with reference to a GPS and surrounding radio wave environment (radio wave signals from a 3G base station, radio waves from an access point of Wifi communication and the like) with a positional information acquisition function, a gyro sensor, an azimuth sensor, an acceleration sensor and the like installed in the smartphone 2.

Meanwhile, the CPU bus 30 is connected to the input I/F 36 for receiving user operations and the output I/F 35 for controlling outputs such as images, sound and LED lighting. The output I/F 35 is a module for transmitting image signals and sound signals to output images and sound from output devices such as a display and a speaker, i.e., output images and sound relating to application software which is executed by the application execution unit 312.

The input I/F 36 is a module for receiving operation signals from an operation device such as a touch panel or buttons. The received operation signals are transmitted to the CPU 31 so that it is possible to perform operations of an OS or each application. Incidentally, in the case of the present embodiment, the input I/F 36 and the output I/F 35 are connected to physical operation switches such as a touch panel, buttons and the like to provide a GUI through which a user operation signal is acquired by displaying display data on an operation screen to prompt a user to perform a touch operation and a button operation in accordance with the display data.

Then, an OS (Operating System) which is developed for smartphone is executed and run on the CPU 31 by an OS execution unit 331 to perform management and control of the basic functions of the smartphone 3. Also, a variety of applications can be executed on this OS by the application execution unit 312 to implement a variety of functions by executing the applications on this CPU 101 by the application execution unit 312 as illustrated in FIG. 4.

The OS execution unit 331 is a module for executing an OS program on the CPU. The basic functions of the smartphone 3 are managed and controlled by executing the OS program with the OS execution unit 331 such that the module built by the application execution unit 312 cooperates with the devices and functions of the smartphone 3.

The application execution unit 312 is a module for executing an application program on the CPU. Specifically, various function modules are virtually built on the CPU by executing the application program on the OS with the application execution unit 312.

In the case of the present embodiment, as modules on the CPU 31 of the guardian service provision system, the OS provides a determination unit 331a, a remote control unit 331b and an OS side notification unit 331c, and the application execution unit 312 executes a guarding target application to provide a notification acquisition unit 312a, a management notification unit 312b and a terminal side recording unit 312c.

The determination unit 331a is a module for determining whether or not the current position of own device is within a monitoring area by the use of the positional information acquisition unit 39 and the monitoring function installed in a OS 311.

The remote control unit 331b is a module for operating an application running on the smartphone 3 as the guarding target terminal, through the smartphone 2 as the management terminal and the guardian service provision server 5, to receive an operation signal from a remote operation unit running on the guardian service provision server 5 and the smartphone 2, remotely perform execution of an application, and remotely control setting operation and execution operation of the determination unit 331a and the OS side notification unit 331c.

The OS side notification unit 331c is a module for notifying the application, as a function of the OS, when the current position of the smartphone 3 moves out of the monitoring area. The notification acquisition unit 312a is a module for acquiring, as a function of the application, a notification from the OS side notification unit 331c. The management notification unit 312b is a module for notifying the current position acquired from the positional information acquisition unit 39 to the smartphone 2 as the management terminal in response to the notification acquired by the notification acquisition unit 312a.

The terminal side recording unit 312c is a module for recording the execution history of the application, the notification history of the management notification unit 312b and the like in the storage 34. Particularly, this terminal side recording unit 312c is provided with the function to delete the information about the current position of the smartphone 3 as the guarding target terminal and generate the history data, when recording the above various histories.

(2) Management Terminal (Smartphone 2)

Next is an explanation of the internal configuration of the smartphone 2 as the management terminal used by the guardian Pa. This smartphone 2 is configured basically in the same manner as the smartphone 3 as described above. Namely, as illustrated in FIG. 3, the smartphone 2 is provided with a communication interface, an input interface, an output interface, a CPU, a memory and the like.

Particularly, as a management terminal, the smartphone 2 virtually builds an information acquisition unit 241, a display data generation unit 242 and a remote operation unit 245, as illustrated in FIG. 5, by executing a management program with the application execution unit.

The information acquisition unit 241 is a module for acquiring various information from other communication terminals such as the guardian service provision server 5, the smartphone 2 and the like. Incidentally, this information acquisition unit 241 acquires information by reading data stored in the memory 25, downloading data from the guardian service provision server 5 or the like server through the communication interface 21, reading data which is generated or processed in the smartphone 2, and so forth. The display data generation unit 242 is a module for generating display data to be displayed in a display unit 23a. The display data includes, besides a Web page, image data, character data, motion picture data, sound data, and other data generated by combining other data items.

The remote operation unit 245 is a module for cooperating with the remote control unit 331b of the smartphone 3, for example, by accessing the smartphone 2 which is the management target terminal, setting the monitoring area and controlling the operation of a management program. Specifically, this remote operation unit 245 is provided with a monitoring area setting unit 245a and a notification acquisition unit 245b.

The remote operation unit 245 can acquire a notification from the smartphone 3 as the management target through the notification acquisition unit 245b, and set the monitoring area and time zone to the smartphone 3 by remote control through the monitoring area setting unit 245a on the basis of the operation by the user (guardian Pa). For example, it is possible to set the monitoring area of the smartphone 3 through the remote operation unit 245 to an area including the moving route of the management target Ch such as the school route and the predetermined region adjacent to the monitoring route such as a park or facility adjacent to the school route. Also, the remote operation unit 245 can perform operation of various applications including a monitoring application through the application execution unit 312 of the smartphone 3.

(3) Management Server

Figure 6:
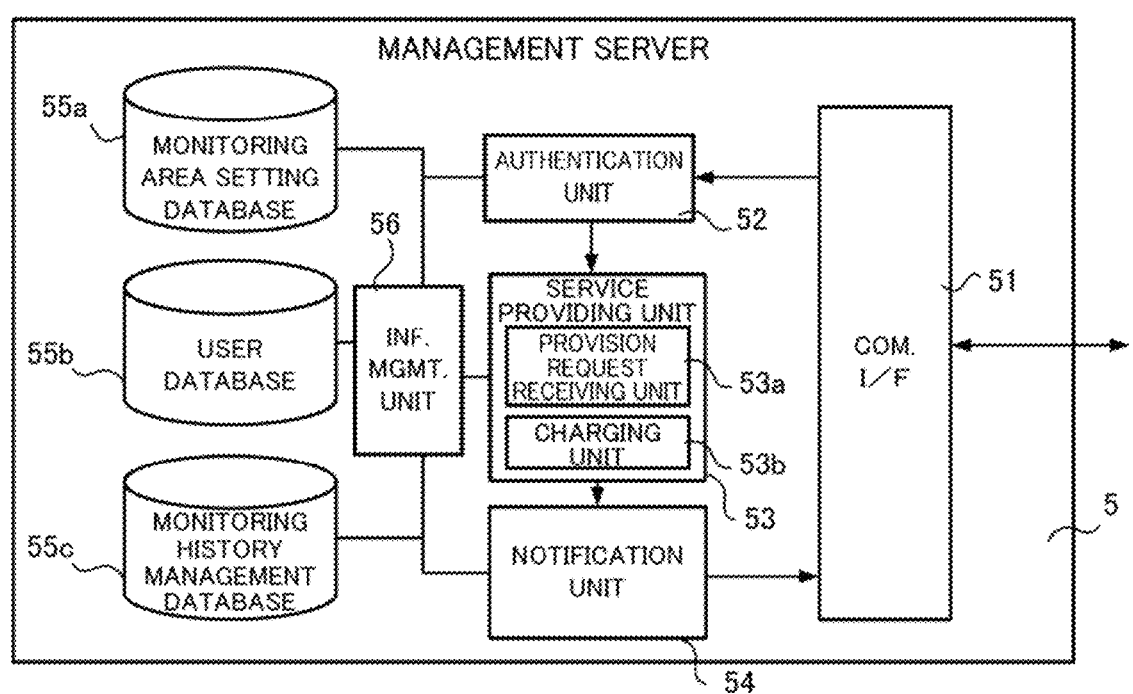
FIG. 6 is a block diagram for showing the hardware configuration of a guardian service provision server in accordance with the embodiment.

Next is an explanation of the internal configuration of the guardian service provision server 5. FIG. 6 is a block diagram for showing the configuration of the guardian service provision server 5. The guardian service provision server 5 is connected to the Internet 4 to performs data transmission and reception mainly with the smartphone 2 used by the guardian Pa and the smartphone 3 used by the management target Ch through the Internet 4.

Specifically, the guardian service provision server 5 is provided with a communication interface 51 for performing data communication through the Internet 4, an authentication unit 52 for authenticating the user or the user terminal having an authority, an information management unit 56 for collecting and managing notification information from each guarding target terminal, a service providing unit 53 and a data accumulating unit 55 (55a to 55c) for accumulating various data.

The data accumulating unit 55 includes a monitoring area setting database 55a for storing setting information about the monitoring area which is set for each terminal, a user database 55b for storing information about registered users (guarding targets and guardians thereof), and a monitoring history management database 55c for managing notifications from the smartphone 3 as a management target of each user as monitoring history information. The data as described above may be accumulated as simple table data or as associated data of a relational database system consisting of a plurality of databases in which relations are defined to each other.

The authentication unit 52 is a module for establishing a communication session with the smartphone 2 or 3 through the communication interface 51, and performing an authentication process for each communication session which is established. This authentication process is performed to acquire authentication information from the smartphone 2 of the guardian Pa which is an accessing device, identify the user and the like by referring to the user database 55b, and give authority to the user. The authentication results (user ID, authentication time, session ID and the like) from this authentication unit 52 are transmitted to the information management unit 56 for use in management of monitoring history information and accumulated in the user database 55b as an authentication history. The service providing unit 53 is provided with a provision request receiving unit 53a for receiving a provision request for provision of managed information from the smartphone 2 used by the guardian Pa, and a charging unit 53b for performing a charging process relating to the service.

The information management unit 56 is a module for accumulating and managing monitoring information which is acquired by the smartphone 2 of the guardian Pa and transferred to the guardian service provision server 5. This information management unit 56 associates identifiers (user ID, terminal ID and the like) of the user and the user terminal identified by the authentication process of the authentication unit 52 with learning history information acquired therefrom, and accumulates the identifiers and the learning history information in the monitoring history management database 55c. On the other hand, when the provision request receiving unit 53a receives a provision request, the information management unit 56 instructs provision of monitoring history corresponding to the request.

(Guardian Service Provision Method)

The guardian service provision method in accordance with the present invention can be implemented by operating the guardian service provision system having the structure as described above. FIG. 7 is a flow chart for showing the operation of the guardian service provision system in accordance with the present invention, and FIG. 8 is an explanatory view for showing an example of setting a monitoring area.

As shown in FIG. 7, first, the positional information acquisition unit 39 implemented in the OS of the smartphone 3 starts acquiring and accumulating the positional information about the current position of the smartphone 3 (S101 and S102). The monitoring area as illustrated in FIG. 8 is remotely set to the positional information acquisition unit 39 of the OS through the remote control unit 331*b*. In the case of the example shown in FIG. 8, a monitoring area A1 is set in a map M1 to include a school route R1 between a school Ob23 and home Ob20 and an area including a park Ob22 and a cramming school Ob21 adjacent to the school route R1. A school child or the like as the monitoring target is illustrated in this map M1 as an icon Ob1.

After the positional information acquisition unit 39 implemented in the OS starts acquiring and accumulating the positional information, the OS determines whether or not the monitoring target is located in the monitoring area ("Y" in S103), and when detecting that the monitoring target moves out of the monitoring area ("N" in S103, S104), the positional information acquisition unit 39 of the OS transmits a notification thereof to the application together with the positional information of the monitoring target (S105). The positional information notified from the OS side is acquired by the management notification unit 312*b* of the application (S106), and an alert including the positional information of the monitoring target is transmitted to the smartphone 2 of the guardian. On the other hand, the management notification unit 312*b* transmits only an operation log which does not include the positional information of the monitoring target to the guardian service provision server 5 (S107).

Receiving the alert (S201) from the management notification unit 312*b*, the smartphone 2 of the guardian outputs an alert (S202) together with the positional information of the monitoring target, performs a synchronization process with the guardian service provision server 5, and records the monitoring history (S203). On the other hand, receiving the operation log (S108) from the management notification unit 312*b*, the guardian service provision server 5 outputs an alert (S302), performs a synchronization process with the smartphone 2 of the guardian, and records the monitoring history (S303).

Next, in the smartphone 3 side, an execution history is recorded as a history of notification execution. In this case, the positional information of the monitoring target transmitted to the application from the OS is deleted under a predetermined condition after saving for a certain period. For example, in accordance with the capacity of the storage area for recording the positional information, the positional information may be sequentially deleted from older data after the capacity becomes full, deleted after a certain period designated by the user passes, or deleted by the user who arbitrarily selects data to be deleted. Also, the way of deleting the positional information can be set up in the smartphone 3 of the monitoring target side, and also can be set up remotely in the smartphone 2 of the guardian side.

Furthermore, when the setting function of deleting the records of the positional information is accessed in the smartphone 3 of the monitoring target side, or when the setting function in the terminal of the monitoring target is accessed from the smartphone 2 of the guardian side, it may be requested to input authentication information such as a password which can be input only by the guardian. Thereafter, the above routine in steps S102 to S108 is repeated ("N" in S109) until the application is finished ("Y" in S109).

(Effect/Action)

In accordance with the embodiment as explained above, it is possible to have the guarding target such as the management target Ch carry the smartphone 3, set the school route R1 and school hours in advance with the smartphone 2 of the guardian Pa as the management terminal, readily acquire the positional information by the application, and notify the smartphone 2 as the management terminal when the management target Ch substantially departs from the school route R1.

At this time, privacy information does not leak during the development/operation of the application because the positional information is acquired by the positional information acquisition unit 39 in the OS side, and the application acquires, from the OS, only the determination result of whether or not the current position of the management target Ch is within the monitoring area. Specifically, the positional information as records of change in the current position of the monitoring target Ch is monitored only by the OS, and transferred to the application only when the monitoring target Ch moves out of the monitoring area. While the positional information transferred to the application is immediately transmitted to the smartphone 2 of the guardian, only the operation log including no positional information is transmitted to the guardian service provision server 5. The positional information transferred to the application of the smartphone 3 and the application of the smartphone 2 is stored or deleted in accordance with the condition which is set by the user.

As a result, in the case of the present embodiment, the personal information including the positional information (motion history) shall not be transferred to the guardian service provision server 5, and will be stored or deleted on the user own responsibility. Because of this, in the developer/operator side of the application, according to the present embodiment, there is no need to ensure a high level security for not leaking privacy information such as positional information when running the application so that it is possible to reduce a burden required for development/operation and guarantee relating to information leakage.

Modified Example

Incidentally, the above explained embodiment shows only one example of the present invention. Because of this, the present invention is not limited to the above embodiment, and various modifications are possible in accordance with the design and so forth without departing from the technical spirit of the invention.

For example, while the positional information which is the change in the current position of the monitoring target is not at all transferred to the server side in the case of the above embodiment, it is also possible to additionally provide an information deletion function for selecting, identifying and surely deleting the personal information of each user distinctively from the positional information of other users in response to a request of the user by recording and managing all the positional information of each user in order that the positional information can be selected and identified distinctively from other users and that the GDPR (General Data Protection Rules) can be observed in a system which is to be secured.

In this case, on the assumption that this information deletion function is provided, the system may be configured to request each user to select whether to approve storing the personal information of the user including the positional information also in the guardian service provision server 5 side. It is therefore possible to improve the diversity of services such that each user can select either the options to reduce the risk of information loss by storing information also in the server side according to user's selection of the additionally provided information deletion function, and to self manage information within own terminal in order not to leak the information.

DESCRIPTION OF REFERENCE SIGNS

A1 . . . monitoring area
Ch . . . management target
Pa . . . guardian
R1 . . . school route
1 . . . guardian service provision system
2, 3 . . . smartphone
4 . . . Internet
5 . . . guardian service provision server
21 . . . communication interface
23a . . . display unit
25 . . . memory
30 . . . CPU bus
31 . . . CPU
32 . . . memory
34 . . . storage
38 . . . clock unit
39 . . . positional information acquisition unit
41, 42 . . . radio base station
51 . . . communication interface
52 . . . certification unit
53 . . . service providing unit
53a . . . provision request receiving unit
53b . . . charging unit
55 . . . data accumulating unit
55a . . . monitoring area setting database
55b . . . user database
55c . . . monitoring history management database
56 . . . information management unit
241 . . . information acquisition unit
242 . . . display data generation unit
245 . . . remote control unit
245a . . . monitoring area setting unit
245b . . . notification acquisition unit
312 . . . application execution unit
312a . . . notification acquisition unit
312b . . . management notification unit
312c . . . terminal side recording unit
331 . . . OS execution unit
331a . . . determination unit
331b . . . remote control unit
331c . . . OS side notification unit

What is claimed is:

1. A guardian service provision system which provides a guardian service for monitoring a guarding target, comprising:
an information terminal possessed by the guarding target;
a server device which is installed on a communication network for collecting and managing notification information from the information terminal;
a management terminal which is another information terminal than the information terminal and can be connected to the information terminal through the communication network, wherein
the information terminal includes:
an application execution unit configured to execute an application on an OS of the information terminal; and
a positional information acquisition unit configured to measure a current position of the information terminal as a function of the OS;
the management terminal includes a monitoring area setting unit configured to set a monitoring area to the positional information acquisition unit,
the information terminal further includes:
an OS side notification unit configured to notify the application, as a function of the OS, when the current position of the information terminal moves out of the monitoring area;
a notification acquisition unit configured to acquire, as a function of the application, a notification from the OS side notification unit; and
a management notification unit configured to notify the current position acquired from the positional information acquisition unit to the management terminal in response to the notification acquired by the notification acquisition unit without notifying the current position to the server device.

2. The guardian service provision system of claim 1 wherein the monitoring area is an area including a moving route of the guarding target and a predetermined region adjacent to the moving route.

3. The guardian service provision system of claim 1 wherein the management terminal further comprises: a remote operation unit configured to perform operation of the application through an application execution unit of the information terminal.

4. A non-transitory computer readable medium having stored thereon a guarding target program which is executed on an information terminal possessed by the guarding target in the guardian service provision system as recited in claim 1 to make the information terminal function as
the notification acquisition unit which acquires, as a function of the application, a notification from the OS side notification unit when the current position of the information terminal moves out of the monitoring area; and
the management notification unit which notifies the current position acquired from the positional information acquisition unit to the management terminal in response to the notification acquired by the notification acquisition unit without notifying the current position to the server device.

5. The non-transitory computer readable medium of claim 4 which makes the information terminal function further as a remote control unit which enables operation of the application by the management terminal.

6. A non-transitory computer readable medium having stored thereon a management terminal program which is executed on a management terminal in the guardian service provision system as recited in claim 1 to make the management terminal function as
a monitoring area setting unit which sets a monitoring area to the positional information acquisition unit.

7. The non-transitory computer readable medium of claim 6 which makes the management terminal function further as a remote control unit which enables operation of the application through the application execution unit of the information terminal.

8. A guardian service provision method which provides a guardian service for monitoring a guarding target through an information terminal possessed by the guarding target, wherein
a server device which is installed on a communication network for collecting and managing notification information from the information terminal is provided,
a management terminal is provided as another information terminal than the information terminal and can be connected to the information terminal through the communication network, and the method comprising:

an execution/setting step of executing an application on an OS of the information terminal by an application execution unit, and setting a monitoring area by a monitoring area setting unit to a positional information acquisition unit which measure a current position of the information terminal as a function of the OS;

a notifying step of notifying the application, by an OS side notification unit as a function of the OS, that the information terminal is out of area when the current position of the information terminal moves out of the monitoring area, and acquiring, as a function of the application, a notification from the OS side notification unit; and a management notifying step of notifying the current position acquired from the positional information acquisition unit to the management terminal by a management notification unit in response to the notification acquired by the notification acquisition unit without notifying the current position to the server device.

9. The guardian service provision method of claim 8 wherein the monitoring area is an area including a moving route of the guarding target and a predetermined region adjacent to the moving route.

10. The guardian service provision method of claim 8 further comprising: a remote operation step of performing operation of the application by a remote operation unit of the management terminal through an application execution unit of the information terminal.

\* \* \* \* \*